(12) United States Patent
Xu

(10) Patent No.: US 11,690,468 B1
(45) Date of Patent: Jul. 4, 2023

(54) GROOVED BRACKET

(71) Applicants: Jiaxiang Xu, Zhejiang (CN); Yacong Wei, Zhejiang (CN)

(72) Inventor: Jiaxiang Xu, Zhejiang (CN)

(73) Assignees: Jiaxiang Xu, Hangzhou (CN); Yacong Wei, Hangzhou (CN)

( * ) Notice: Subject to any disclaimer, the term of this patent is extended or adjusted under 35 U.S.C. 154(b) by 0 days.

(21) Appl. No.: 17/566,767

(22) Filed: Dec. 31, 2021

(51) Int. Cl.
  *F16L 3/02* (2006.01)
  *A47H 1/142* (2006.01)
  *F16M 13/02* (2006.01)

(52) U.S. Cl.
  CPC ............. *A47H 1/142* (2013.01); *F16M 13/02* (2013.01)

(58) Field of Classification Search
  CPC .............................. A47H 1/142; F16M 13/02
  See application file for complete search history.

(56) References Cited

U.S. PATENT DOCUMENTS

| | | | | |
|---|---|---|---|---|
| 1,567,744 A | * | 12/1925 | Mathis | A47H 1/13 248/256 |
| 1,873,506 A | * | 8/1932 | Sullivan | A47H 1/13 248/255 |
| 2,386,854 A | * | 10/1945 | Hilton | A47H 1/142 248/254 |
| 3,239,070 A | * | 3/1966 | Clauson | A47H 1/142 211/105.1 |
| 3,664,511 A | * | 5/1972 | Fenwick | A47F 5/08 211/105.1 |
| 4,002,322 A | * | 1/1977 | Matsubara | E04F 11/1804 256/65.06 |
| 4,322,050 A | * | 3/1982 | Roach | A47H 1/122 248/265 |
| 10,228,080 B2 | * | 3/2019 | Zvak | F16L 3/02 |
| 10,648,492 B2 | * | 5/2020 | Hanley | A47H 1/142 |
| 11,452,398 B2 | * | 9/2022 | Berman | A47H 1/142 |
| 2021/0219764 A1 | * | 7/2021 | Berman | A47H 1/142 |
| 2022/0087467 A1 | * | 3/2022 | Zuchel, Jr. | A47H 1/142 |

* cited by examiner

*Primary Examiner* — Amy J. Sterling

(57) ABSTRACT

The present application relates to a grooved bracket, which includes a base body for external connection and a first hook part connected to the base body, the bent part of the first hook part forms a trench groove, the inner wall of the trench groove is provided with an embedded groove along the bent path of the first hook part, an embedded body is embedded in the embedded groove, and part of the embedded body exceeds the embedded groove and falls into the range of the trench groove. The present application has the effect that the rod is easy to install and not easy to fall off.

19 Claims, 10 Drawing Sheets

A-A

GROOVED BRACKET

TECHNICAL FIELD

The present application relates to the field of mounting brackets, and in particular, to a grooved bracket.

BACKGROUND ART

The bracket is often installed on the wall or ceiling. It is the basic component used to support objects. When in use, it is generally matched with rod parts, and the rod parts are connected to the adjacent bracket, so that the rod is suspended in the air. This kind of rod is generally used for hanging curtains, toiletries, projection curtains and other objects.

There are generally two ways of connecting bracket and rod: first, it is locked and fixed, but the rod is often easier to be damaged than the bracket, such as bending, deformation and breaking of the rod; or used in hanging curtains, the curtains often need to be cleaned or replaced regularly, and the bracket is often not suitable for disassembly because it is installed on the wall or ceiling, so it is inconvenient to use.

The second is to provide grooves on the surface of the bracket and erect both ends of the rod on the grooves of two or more brackets. Although such can achieve the purpose of replacing the rod, it is often difficult for different rods to just fit with the grooves of the bracket. The rod and bracket need a certain hardness as weighing parts. Therefore, in order to install smoothly, the rod should be slightly smaller than the opening of the groove, so the rod is easy to loosen relative to the groove and has poor stability.

SUMMARY

In order to realize that the rod can be disassembled relative to the bracket and ensure sufficient stability, the present application provides a grooved bracket.

The grooved bracket provided by the present application adopts the following technical solution:

A grooved bracket includes a base body for external connection and a first hook part connected to the base body, the bent part of the first hook part forms a trench groove, the inner wall of the trench groove is provided with an embedded groove along the bent path of the first hook part, an embedded body is embedded in the embedded groove, and part of the embedded body exceeds the embedded groove and falls into the range of the trench groove.

By adopting the above technical solution, the embedded body can be replaced relative to the first hook part. Therefore, the embedded body can be replaced with an embedded body suitable for the rod according to the specifications and dimensions of the rod. According to the actual application requirements, the embedded body can be selected as a material with low elastic coefficient or good damping performance, or even the same metal to meet some stiffness requirements. No matter whether the embedded body is completely fitted with the groove bottom of the embedded groove, it is at least fitted with the side wall of the embedded groove. Therefore, the embedded body is not easy to loosen relative to the hook. In this way, the rods of different sizes can just fit with the groove, so as to realize the effect that the rods can be disassembled relative to the bracket and ensure sufficient stability.

In some embodiments, part or all of the first hook part at the position of the groove is an arc, and when the base body is installed to the bottom of the vertical plane or horizontal plane, the center of curvature of the arc is lower than both ends of the embedded body.

By adopting the above technical solution, the center of the rod fitting with the embedded body and installed in the groove will be arranged in the groove, and the embedded body at least wraps the semicircular surface of the rod, which can effectively ensure that the rod is not easy to fall off.

In some embodiments, the embedded body is elastic, and the groove bottom of the embedded groove is provided with a protrusion in an area higher than the center of curvature of the first hook part.

By adopting the above technical solution, the gap of the surrounding ring of the embedded body shrinks, the embedded body will wrap more than half of the perimeter of the rod, and the rod will not fall off easily.

In some embodiments, the surface of the embedded body is provided with a convex edge in the area higher than the center of curvature of the first hook part, and the convex edge abuts against the groove bottom of the embedded groove.

By adopting the above technical solution, the gap of the surrounding ring of the embedded body shrinks, and the "gap of the surrounding ring" in the later text will be directly expressed by "opening". After contraction, the embedded body will wrap more than half of the perimeter of the rod, and the rod will not fall off easily, and the convex edge is smaller than the embedded body, so that the convex edge itself and the part supported by the convex edge are suspended to form an elastic structure. Even if the embedded body adopts metal materials with certain hardness, the rod can be installed into the groove.

In some embodiments, the convex edge extends along the width direction of the embedded body, and the convex edge is inclined integrally away from the groove bottom of the embedded groove.

By adopting the above technical solution, on the one hand, the embedded body is easy to install into the embedded groove, but it is difficult to separate from the relative installation. On the other hand, when the rod is installed into the groove, the rod will deform or force the embedded body to move to the depth of the groove, and the convex edge will show a tendency of lodging in this process because it faces outward, that is, the opening of the embedded body will expand, making the rod easy to install. When the rod is pulled out, the convex edge will be forced to support and the opening of the embedded body will shrink, so it will be difficult for the rod and the embedded body to leave the groove. The present application has the advantages of convenient installation and not easy to fall off.

In some embodiments, the surface of the embedded body is provided with at least two convex edges, which are arranged along the length direction of the embedded body.

By adopting the above technical solution, multiple convex edges are supported together, which is not easy to cause the problem of excessive overturning of convex edges in the process of supporting.

In some embodiments, the embedded body includes an arc section, two transition sections and two inclined head sections, which are integrally formed together, the two transition sections are respectively connected to both ends of the arc section, the inclined head section is connected to one end of the transition section away from the arc section, and the inner wall of the inclined head section is smoothly connected with the inner wall of the transition section, a first spacing between the two inclined head sections at one end close to the transition section is less than a second spacing between the two inclined head sections at one end away from the transition section, and the convex edge is arranged on the outer wall of the inclined head section.

By adopting the above technical solution, the arc section and transition section are adapted to the embedded groove, the inclined head section provides guidance as an opening to make the rod easier to install, and forces the inclined head section to expand outward rather than curl inward when the rod is installed. In addition, supported by the convex edge, the part connecting the inclined head section and the transition section will become the neck to prevent the rod from falling off.

In some embodiments, the first hook part and the embedded body are U-shaped, a U-shaped end of the first hook part is connected to the base body, and the first hook part is integrally formed with the base body.

By adopting the above technical solution, the U-shaped structure can deepen the depth of the groove, the embedded body is not easy to slide relative to the embedded groove, and the rod is not easy to fall off.

In some embodiments, the groove depth of the embedded groove is gradually shallowed from the groove bottom of the trench groove to both ends of the embedded groove in a length direction.

By adopting the above technical solution, on the one hand, it provides guidance for the installation of the embedded body, on the other hand, it can naturally shrink the opening of the embedded body, so that the rod is not easy to fall off.

In some embodiments, the groove depth of the embedded groove is intermittently shallowed from the groove bottom of the trench groove to both ends of the embedded groove in a length direction.

By adopting the above technical solution, on the one hand, it provides guidance for the installation of the embedded body, on the other hand, it can naturally shrink the opening of the embedded body, so that the rod is not easy to fall off.

In some embodiments, the embedded groove extends to the base body, and the embedded groove of the base body is gradually shallowed from one end close to the hook part to one end away from the hook part.

By adopting the above technical solution, the embedded groove provides introduction and positioning, and improves the smoothness of embedded body disassembly.

In some embodiments, the base body includes an upper frame and a lower frame, the first hook part is connected to the upper frame, the outer wall of the first hook part is extended with an engaging hole, the head of the lower frame is provided with a convex column inserted and matched with the engaging hole, and the tail of the lower frame is detachably connected with the upper frame.

By adopting the above technical solution, the upper frame and lower frame can be separately cast and formed, and then assembled. The process is relatively simple and the process cost is low. It also provides a processing basis for the complex frame structure of the base body. In this way, on the one hand, the overall beauty of the bracket can be improved, on the other hand, the bearing capacity of multi frame support is higher than that of traditional single casting.

In some embodiments, the engaging hole communicates with the embedded groove, and the end of the convex column is arranged in the embedded groove.

By adopting the above technical solution, the convex column can jack up part of the groove of the embedded body, so that the embedded body and the rod can be pressed more tightly, especially when the convex position is close to the opening of the embedded body, it can also play the role of closing.

In some embodiments, the side walls near both ends of the embedded body are provided with a plurality of convex edges arranged along the length direction, and the convex columns fall into intervals between the convex edges.

By adopting the above technical solution, the convex column and the convex edge can form a limit structure, so that the embedded body cannot be brought out of the embedded groove during the removal of the rod. When it is necessary to disassemble the embedded body, the end of the embedded body can be bent and pulled out based on the warping of the convex edge on the embedded body.

In some embodiments, the end of the upper frame away from the first hook part is fixed with a tailstock, the end of the lower frame away from the first hook part is against the tailstock, the tailstock is fixedly connected with the lower frame through bolts, and the side end of the lower frame is against the side end of the upper frame.

By adopting the above technical solution, the rapid assembly can be realized with the convex column, and the overall gap is small and the beauty is high after assembly.

In some embodiments, the side of the lower frame facing the upper frame is provided with a second hook part, and the second hook part is also provided with a trench groove, an embedded groove and an embedded body.

By adopting the above technical solution, one bracket can hang two rods and corresponding curtains.

In some embodiments, an auxiliary hole is arranged at the position corresponding to the groove bottom of the groove on the outer wall of the hook part, and the auxiliary hole communicates with the embedded groove.

By adopting the above technical solution, the embedded body can be directly poked out or disassembled by inserting a small-diameter tool into the auxiliary hole, making the replacement of the embedded body more convenient.

In some embodiments, the inner wall of the groove is concavely formed with a side groove extending through one of the side walls of the hook part, and the side groove communicates with the embedded groove.

By adopting the above technical solution, the embedded body can be pried through the side groove to make the disassembly of the embedded body more convenient.

In some embodiments, the outer wall of the hook part is extended with a side top hole along the direction perpendicular to the axis of the groove, the side top hole communicates with the embedded groove and extends through the groove bottom of the trench groove, and the side top hole is extended with a top rod.

By adopting the above technical solution, the part of the embedded body at the bottom of the groove is an arc, the laterally inserted top rod can gradually extrude the embedded body from the groove along the arc, and the extruded embedded body can be grasped at the open end of the first hook part and continue to be pulled out.

In some embodiments, a top sheet is fixed on the peripheral side wall of the top rod, the surface of the top sheet in the axial direction of the top rod is a guide surface, the side wall of the side top hole is provided with a slide for the top sheet to slide, the end face of the top rod is also a guide surface, and the guide surface of the top sheet and the guide surface of the top rod are arranged on the same side.

By adopting the above technical solution, the matching of the top sheet and the slide can define the orientation of the guide surface. In the process of use, the embedded body is squeezed by the guide surface first, and then the top rod continues to feed, and the top sheet continues to push out the embedded body, so that the embedded body can be directly pushed out or the embedded body can be in a position convenient for pulling out. In this way, the damage to the embedded body is very small, the embedded body is not easy to deform, and the reuse of the embedded body can be realized.

To sum up, the present application includes at least one of the following beneficial technical effects:

1. the embedded body is replaceable relative to the first hook part, so it can be replaced with an embedded body suitable for the rod according to the specifications and dimensions of the rod. According to the actual application requirements, the embedded body can be selected as a material with low elastic coefficient or good damping performance, or even the same metal to meet some stiffness requirements. No matter whether the embedded body is completely fitted with the groove bottom of the embedded groove, it is at least fitted with the side wall of the embedded groove. Therefore, the embedded body is not easy to loosen relative to the hook. In this way, the rods of different sizes can just fit with the groove, so as to realize the effect that the rods can be disassembled relative to the bracket and ensure sufficient stability;

2. the necking structure is adopted to make the rod easy to install but not easy to fall off;

3. a variety of auxiliary structures are adopted to facilitate the disassembly and assembly of the embedded body and realize the reuse of the embedded body.

DETAILED DESCRIPTION

The present application is described in further detail below in combination with FIGS. 1-10.

Embodiments of the present application disclose a grooved bracket.

Figure 1:
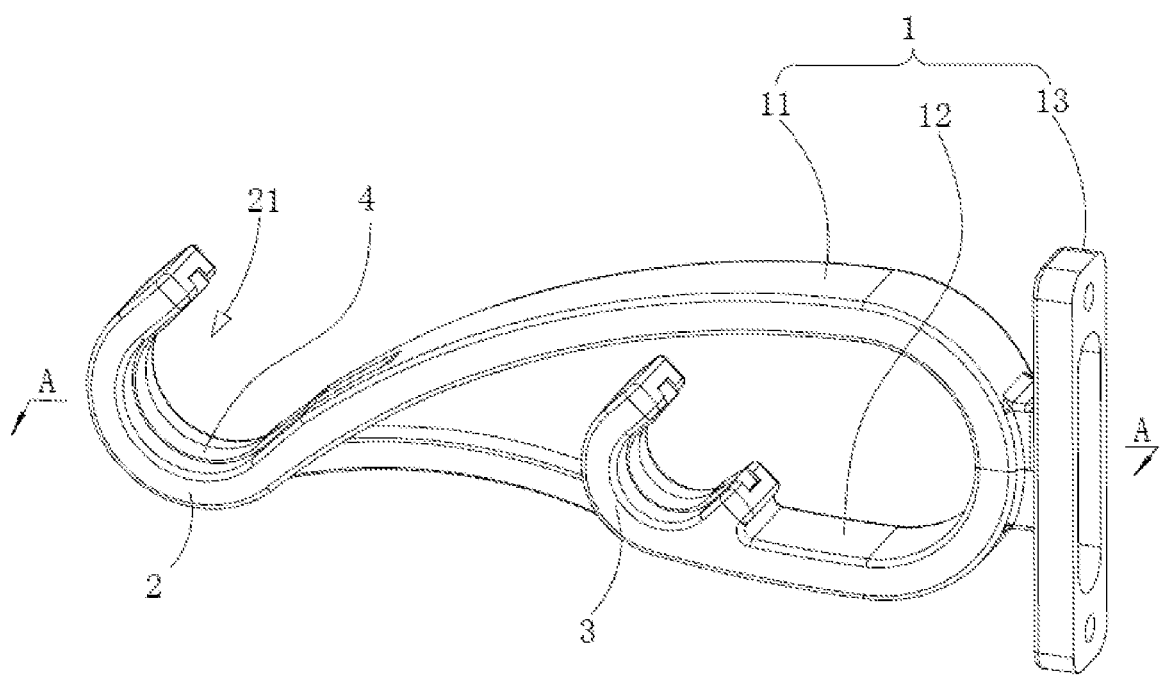
FIG. 1 is an overall structural diagram of the grooved bracket of embodiment 1.
Figure 2:
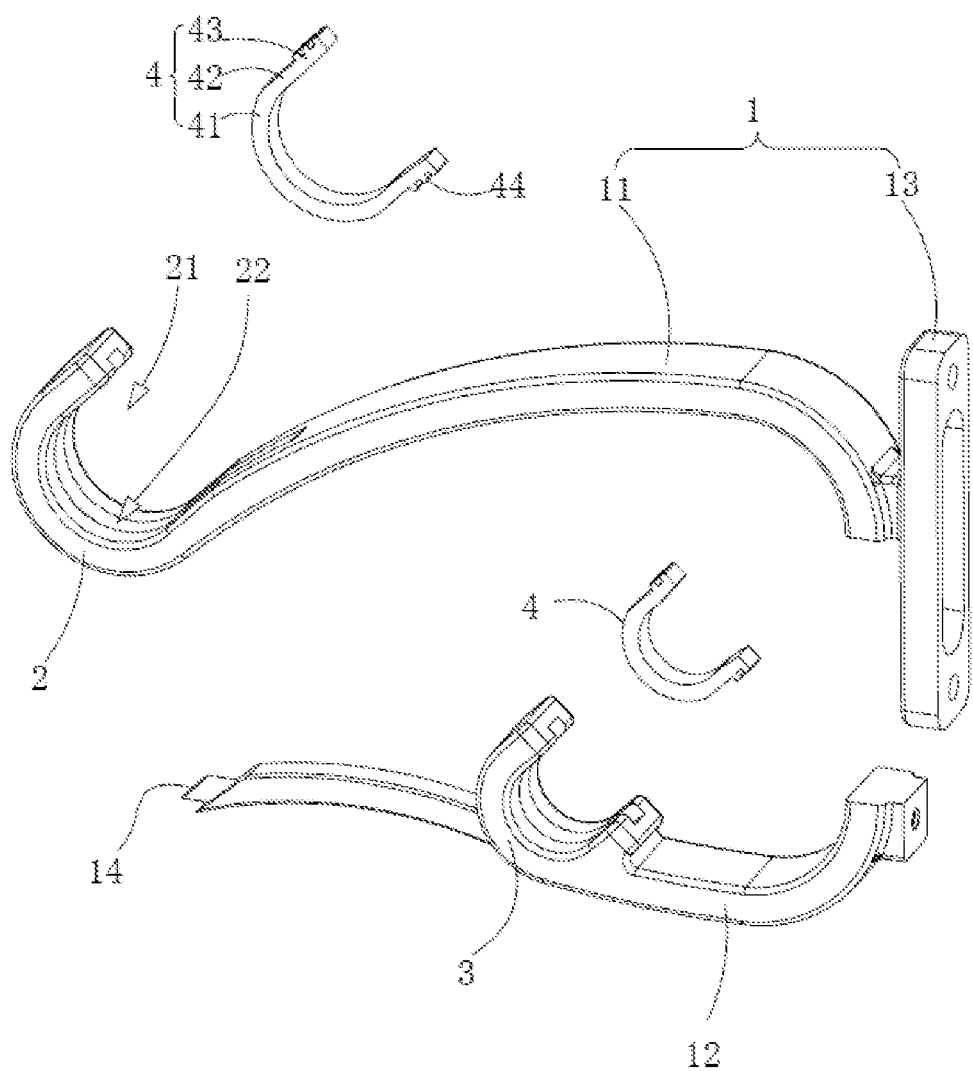
FIG. 2 is an exploded view of the grooved bracket of Embodiment 1.

Embodiment 1: referring to FIG. 1 and FIG. 2, a grooved bracket includes a base body 1, a first hook part 2 and a second hook part 3. In this embodiment, the base body 1, the first hook part 2 and the second hook part 3 are made of metal to ensure a certain stiffness. The base body 1 includes an upper frame 11 and a lower frame 12, and the first hook part 2 is arranged at one end of the upper frame 11 and formed integrally with the upper frame 11. The second hook part 3 is arranged in the middle of the lower frame 12 and integrated with the lower frame 12, and the second hook part 3 is arranged on the side of the lower frame 12 close to the upper frame 11.

One end of the upper frame 11 away from the first hook part 2 is fixed with a tailstock 13, the tailstock 13 is substantially in a strip-shaped block structure, and the upper frame 11 is fixed on the surface of the strip-shaped structure of the tailstock 13. In this embodiment, the upper frame 11 and the tailstock 13 are integrally formed. The surface near both ends of the tailstock 13 is provided with two holes for threading screws to fix the tailstock 13 to the wall or ceiling.

Figure 3:
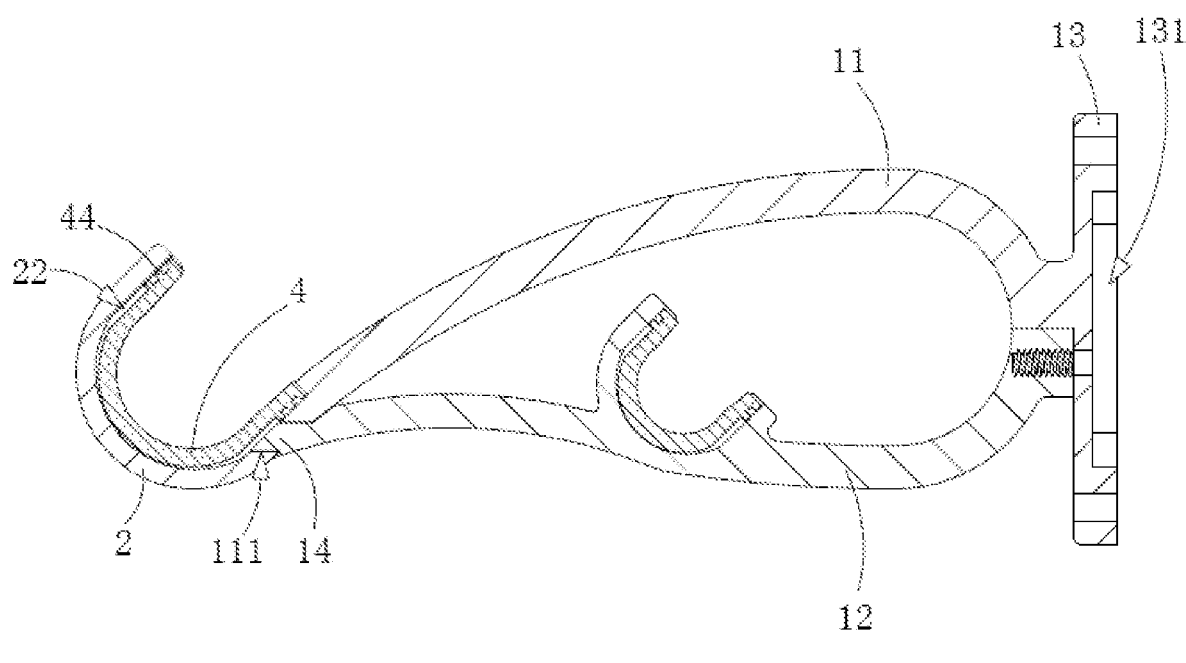
FIG. 3 is a sectional view in the A-A direction of FIG. 1 of Embodiment 1.

Referring to FIG. 2 and FIG. 3, one end of the lower frame 12 away from the first hook part 2 butts against the tailstock 13, the side end of the lower frame 12 butts against the side end of the upper frame 11, and the tailstock 13 is fixedly connected with the lower frame 12 through bolts. During installation, the bolts are installed vertically to the surface of the strip-shaped structure of the tailstock 13 from the side of the tailstock 13 away from the upper frame 11. Correspondingly, the side of the tailstock 13 away from the upper frame 11 is provided with an accommodation groove 131 for the nut of the bolt to be placed. One end of the lower frame 12 away from the tailstock 13 is fixed with a convex column 14, the outer wall of the first hook part 2 is extended with an engaging hole 111 for the convex column 14 to be inserted, the axis of the convex column 14 is perpendicular to the surface of the strip-shaped structure of the tailstock 13, the end face of the convex column 14 is an inclined plane, and the inclined plane faces the upper frame 11. During installation, the convex column 14 is obliquely inserted into the engaging hole 111. In this process, the lower frame 12 rotates continuously until it abuts against the side end of the upper frame 11, and then moves along the axial direction of the convex column 14 to make the lower frame 12 abut against the surface of the tailstock 13.

In this embodiment, the structures of the first hook part 2 and the second hook part 3 are substantially the same, and they are U-shaped, but the dimensions and specifications are different, and the connection positions are different. The first hook part 2 is connected to the upper frame 11 with a U-shaped end, and the second hook part 3 is connected to the lower frame 12 with a U-shaped outer wall. In terms of structure, the present embodiment takes the first hook part 2 as an example. In other embodiments, the second hook part 3 may have only a partial structure of the first hook part 2.

The bent part of the first hook part 2 forms a trench groove 21, the inner wall of the trench groove 21 is provided with an embedded groove 22 along the bent path of the first hook part 2, the embedded groove 22 extends to the base body 1, and the embedded groove 22 of the base body 1 is gradually shallowed from one end close to the hook part to one end away from the hook part. The embedded body 4 is embedded in the embedded groove 22. In this embodiment, the embedded body 4 is plastic, and in other embodiments, it can also be a metal material with low elastic coefficient. Part of the embedded body 4 exceeds the embedded groove 22 and falls into the trench groove 21. The part of exceeding can be regarded as the part exceeding the embedded groove 22 along a portion of the length direction of the embedded body 4, or the part exceeding the embedded groove 22 along all of the length direction of the embedded body 4 as well as along a portion of the thickness direction. If the rod can abut against the embedded body 4 during the installation process and/or after the installation, it is regarded as the part exceeding the embedded groove 22. In this embodiment, a case that the overall thickness of the embedded body 4 is greater than the groove depth of the embedded groove 22 is taken as an example.

In this embodiment, the embedded body 4 is in a U-shape, which can be disassembled as follows: the embedded body 4 includes an arc section 41, two transition sections 42 and two inclined head sections 43, which are integrally formed together, and the two transition sections 42 are respectively connected to both ends of the arc section 41. The inclined head section 43 is connected to the end of the transition section 42 away from the arc section 41, the inner wall of the inclined head section 43 is smoothly connected with the inner wall of the transition section 42, and the first spacing between the two inclined head sections 43 at the end close to the transition section 42 is less than the second spacing between the two inclined head sections 43 at the end away from the transition section 42. When the base body 1 is installed to the wall or ceiling, the arc center of curvature of the trench groove 21 is lower than the inclined head section 43 of the embedded body 4.

The embedded body 4 is provided with a convex edge 44 on the outer wall of the inclined head section 43, and the convex edge 44 abuts against the groove bottom of the embedded groove 22. In this embodiment, there are three convex edges 44 of the first hook part 2 and two convex edges 44 of the second hook part 3, and the convex edges 44 are arranged along the length direction of the embedded body 4. Each convex edge 44 extends along the width direction of the embedded body 4, and the convex edge 44 is inclined integrally away from the groove bottom of the of the embedded groove 22.

The implementation principle of Embodiment 1 is: the embedded body 4 can be smoothly installed into the embedded groove 22 based on the gradient characteristics of the trench groove 21, and the end warping is formed based on the convex edge 44. The disassembly of the embedded body 4 can be realized by scratching and pulling. In this way, the embedded body 4 can be replaced based on the specification of the adaptive rod.

After the installation, the embedded body 4 will protrude into the trench groove 21 at the connection position between the transition section 42 and the inclined head section 43, and the opening at the end of the embedded groove 22 has a guide insertion structure, so that the rod is easy to install and is not easy to fall off after installation.

Figure 4:
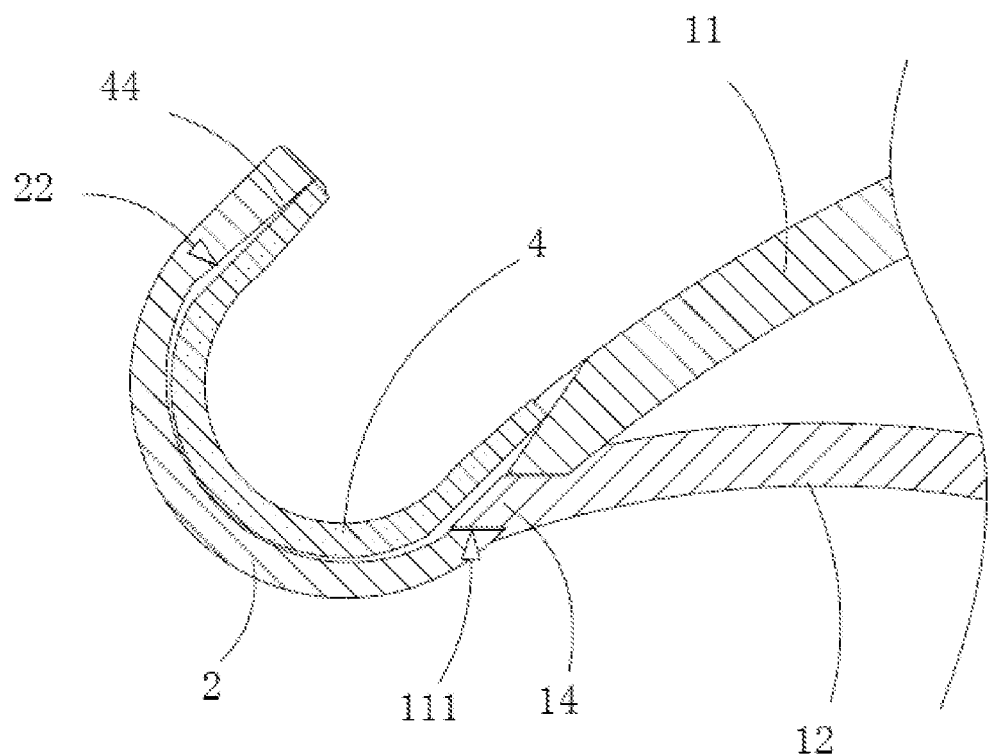
FIG. 4 is a structural diagram of the hook part of Embodiment 2.

Embodiment 2: referring to FIG. 4, the difference between this embodiment and Embodiment 1 is that the groove depth of the embedded groove 22 is gradually shallowed from the groove bottom of the trench groove 21 to both ends of the length direction of the embedded groove 22.

Figure 5:
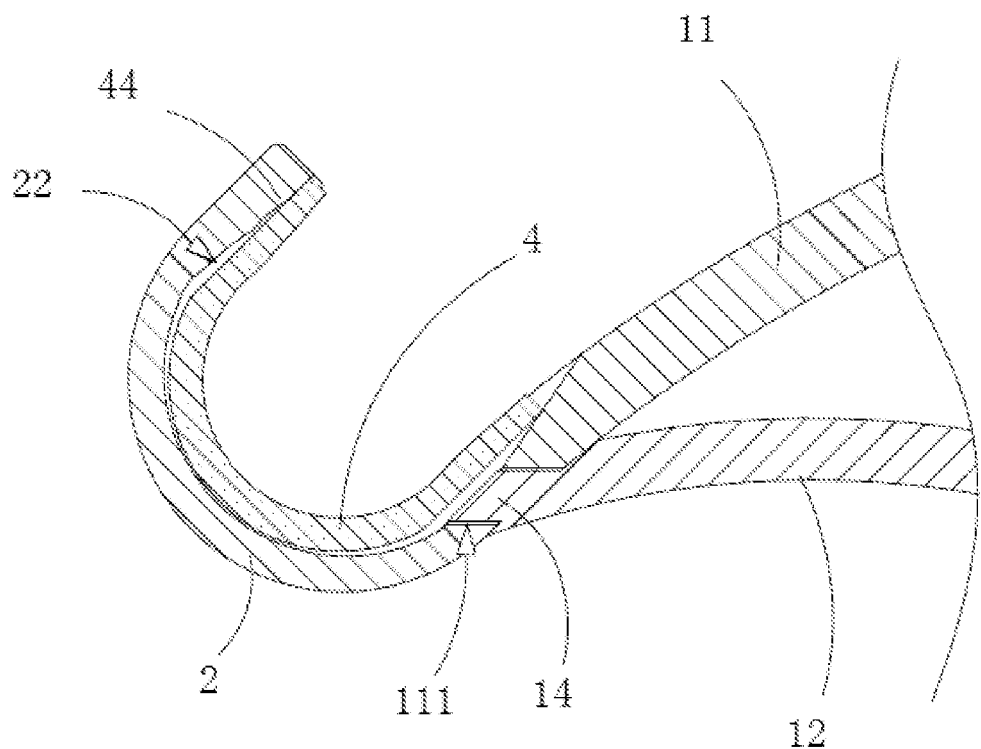
FIG. 5 is a structural diagram of the hook part of Embodiment 3.

Embodiment 3: referring to FIG. 5, the difference between this embodiment and Embodiment 1 is that the groove depth of the embedded groove 22 is intermittently shallowed from the groove bottom of the trench groove 21 to both ends of the length direction of the embedded groove 22. The discontinuous parts are flush with the outer wall of the inclined head section 43, so that the inclined head section 43 can fit with the surface of the discontinuous part.

Figure 6:
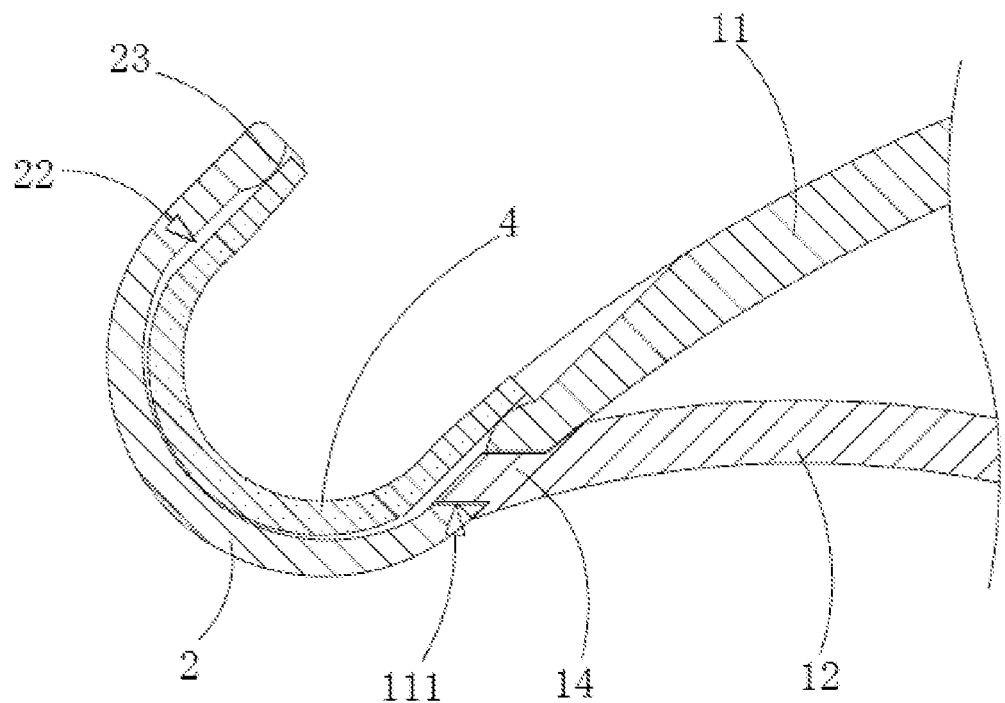
FIG. 6 is a structural diagram of the hook part of Embodiment 4.

Embodiment 4: referring to FIG. 6, the difference between this embodiment and Embodiment 1 is that there is no convex edge 44 on the surface of the embedded body 4, and the groove bottom of the embedded groove 22 is provided with a protrusion 23 in an area higher than the center of curvature of the first hook part 2.

Figure 7:
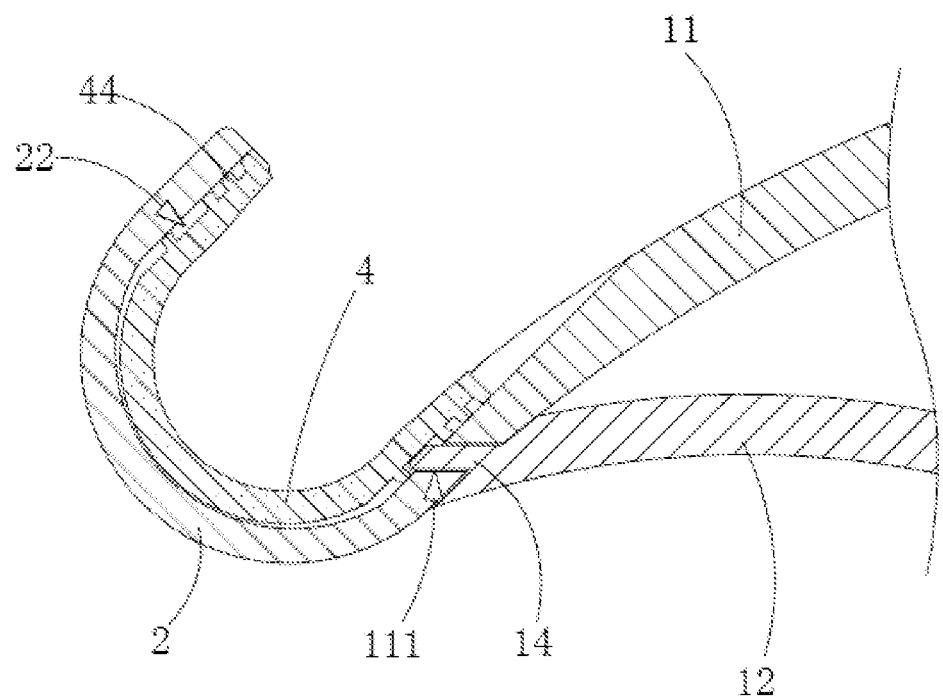
FIG. 7 is a structural diagram of the hook part of Embodiment 5.

Embodiment 5: referring to FIG. 7, the difference between this embodiment and Embodiment 1 is that the engaging hole 111 communicates with the embedded groove 22, and the end of the convex column 14 is arranged in the embedded groove 22. The side walls near both ends of the embedded body 4 are provided with a plurality of convex edges 44 arranged along the length direction. The position of the convex edges 44 is not limited to the inclined head section, but can also be arranged in the linear part or arc part, and the convex column 14 falls into the intervals between the convex edges 44.

In this way, the installation stability between the embedded body 4 and the trench groove can be strengthened, but the disassembly and assembly of the embedded body 4 is more difficult than that in Embodiment 1.

Figure 8:
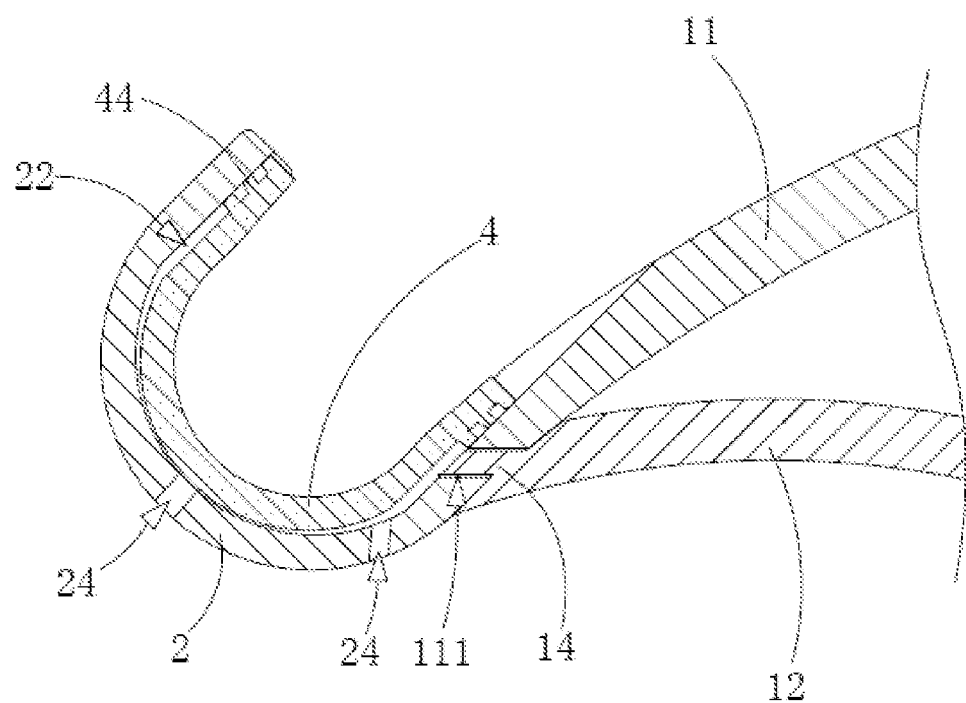
FIG. 8 is a structural diagram of the hook part of Embodiment 6.

Embodiment 6: referring to FIG. 8, the difference between this embodiment and Embodiment 1 is that an auxiliary hole 24 is arranged at the position corresponding to the outer wall of the first hook part 3 and the groove bottom of the trench groove 21, the auxiliary hole 24 communicates with the embedded groove 22, and the opening of the auxiliary hole 24 faces the opening of the first hook part 2. The auxiliary hole 24 may be arranged in the middle of the arc part of the hook part, or may be other arc parts.

In this way, if the auxiliary hole 24 is arranged in the middle of the arc part of the hook part, the embedded body 4 can be directly poked out by inserting a small-diameter tool into the auxiliary hole 24. If the auxiliary hole 24 is arranged in other parts of the hook part, the embedded body 4 can be bent by inserting a small-diameter tool into the auxiliary hole 24, and then taken out manually.

Figure 9:
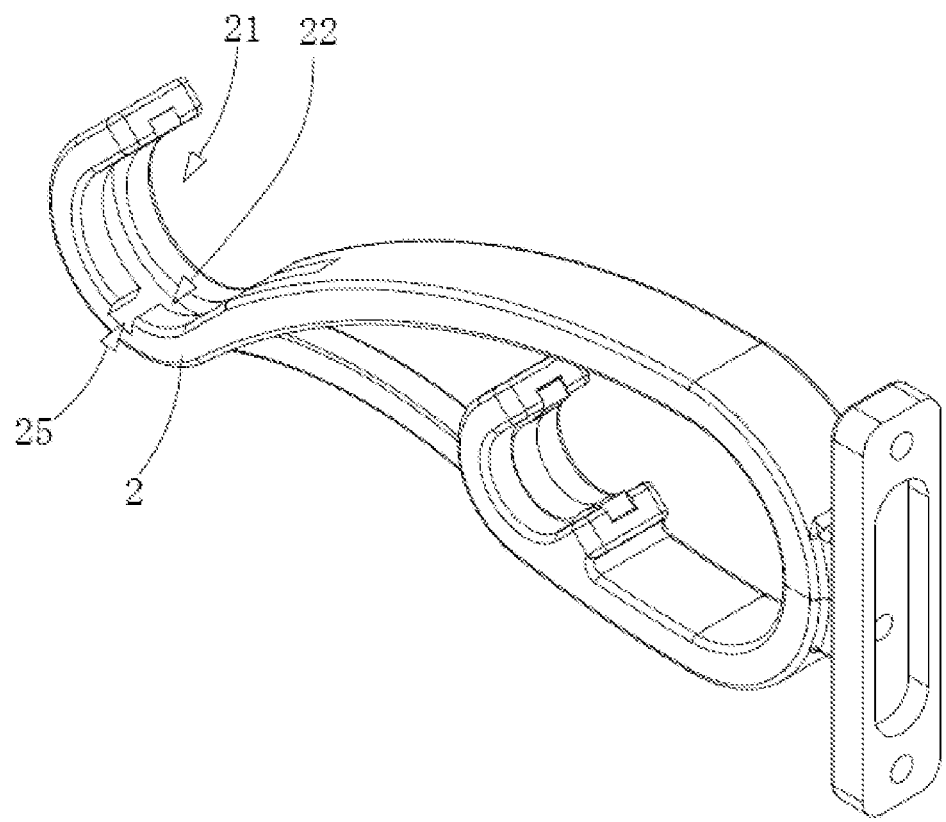
FIG. 9 is an overall structural diagram of the grooved bracket of Embodiment 7.

Embodiment 7: referring to FIG. 9, the difference between this embodiment and Embodiment 1 is that the inner wall of the trench groove 21 is concavely formed with a side groove 25 extending through one of the side walls of the hook part, and the side groove 25 communicates with the embedded groove 22.

Figure 10:
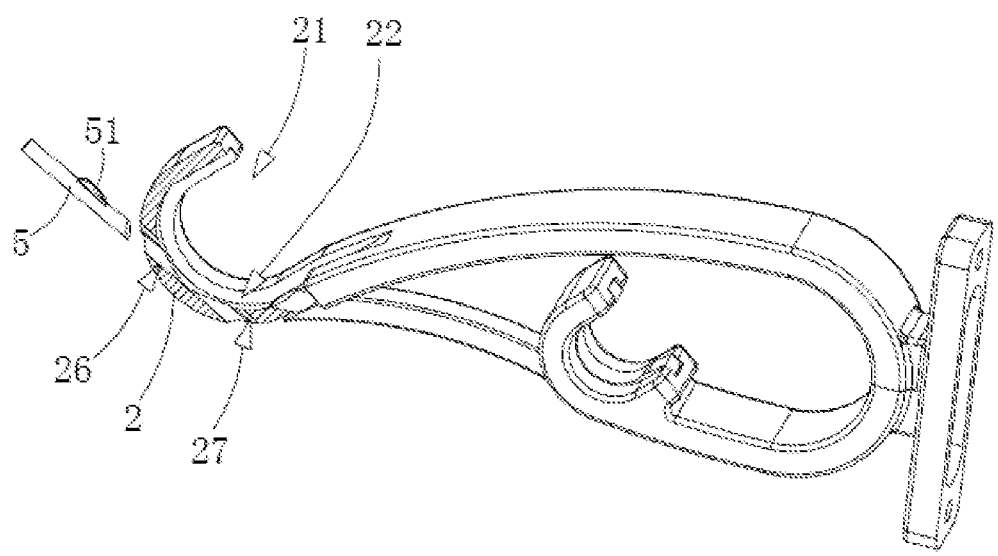
FIG. 10 is an overall structural diagram of the grooved bracket of Embodiment 9.

Embodiment 8: referring to FIG. 10, the outer wall of the hook part is provided with a side top hole 26 along the direction perpendicular to the axis of the trench groove 21, the side top hole 26 communicates with the embedded groove 22 and extends through the groove bottom of the trench groove 21, and the side top hole 26 is provided with a top rod 5. The peripheral side wall of the top rod 5 is fixed with a top sheet 51, the surface of the top sheet 51 in the axial direction of the top rod 5 is a guide surface, the side wall of the side top hole 26 is provided with a slide 27 for the sliding of the top sheet 51, the end face of the top rod 5 is also a guide surface, and the guide surface of the top sheet 51 and the guide surface of the top rod 5 are arranged on the same side.

The implementation principle of Embodiment 2 is: the part of the embedded body 4 at the groove bottom of the trench groove 21 is an arc, and the laterally inserted top rod 5 can gradually extrude the embedded body 4 from the embedded groove 22 along the arc. In the process of use, first squeeze the embedded body 4 from the guide surface, then the top rod 5 continues to feed, and the top sheet 51 continues to eject the embedded body 4. In this way, the embedded body 4 can be directly ejected or the embedded body 4 can be in a position convenient for pulling out. In this way, the damage to the embedded body 4 is very small, the embedded body 4 is not easy to deform, and the reuse of the embedded body 4 can be realized.

The above are the preferred embodiments of the present application and do not limit the scope of protection of the present application. Therefore, all equivalent changes made according to the structure, shape and principle of the present application shall be covered by the scope of protection of the present application.

What is claimed is:

1. A grooved bracket, comprising a base body for external connection and a first hook part connected to the base body, wherein a bent part of the first hook part forms a trench groove, an inner wall of the trench groove is provided with an embedded groove along a bent path of the first hook part, an embedded body is embedded in the embedded groove, and part of the embedded body exceeds the embedded groove and falls into a range of the trench groove;
a top sheet is fixed on a peripheral side wall of a top rod, a surface of the top sheet in an axial direction of the top rod is a guide surface, a side wall of the side top hole is provided with a slide for the top sheet to slide, an end face of the top rod is also a guide surface, and the guide surface of the top sheet and the guide surface of the top rod are arranged on the same side.

2. The grooved bracket according to claim 1, wherein part or all of the first hook part at a position of the trench groove is an arc, and when the base body is installed to a bottom of the vertical plane or horizontal plane, a center of curvature of the arc is lower than both ends of the embedded body.

3. The grooved bracket according to claim 2, wherein the embedded body is elastic, and a groove bottom of the embedded groove is provided with a protrusion in an area higher than the center of curvature of the first hook part.

4. The grooved bracket according to claim 2, wherein a surface of the embedded body is provided with a convex edge in the area higher than the center of curvature of the first hook part, and the convex edge abuts against a groove bottom of the embedded groove.

5. The grooved bracket according to claim 4, wherein the convex edge extends along a width direction of the embedded body, and the convex edge is inclined integrally away from the groove bottom of the embedded groove.

6. The grooved bracket according to claim 5, wherein a surface of the embedded body is provided with at least two convex edges, and the convex edges are arranged along a length direction of the embedded body.

7. The grooved bracket according to claim 4, wherein the embedded body comprises an arc section, two transition sections and two inclined head sections, which are integrally formed together, the two transition sections are respectively connected to both ends of the arc section, the inclined head section is connected to one end of the transition section away from the arc section, and an inner wall of the inclined head section is smoothly connected with an inner wall of the transition section, a first spacing between the two inclined head sections at one end close to the transition section is less than a second spacing between the two inclined head sections at one end away from the transition section, and the convex edge is arranged on an outer wall of the inclined head section.

8. The grooved bracket according to claim 1, wherein the first hook part and the embedded body are U-shaped, a U-shaped end of the first hook part is connected to the base body, and the first hook part is integrally formed with the base body.

9. The grooved bracket according to claim 1, wherein a groove depth of the embedded groove is gradually shallowed from a groove bottom of the trench groove to both ends of the embedded groove in a length direction.

10. The grooved bracket according to claim 1, wherein a groove depth of the embedded groove is intermittently shallowed from the groove bottom of the trench groove to both ends of the embedded groove in a length direction.

11. The grooved bracket according to claim 1, wherein the embedded groove extends to the base body, and the embedded groove of the base body is gradually shallowed from one end close to the hook part to one end away from the hook part.

12. The grooved bracket according to claim 1, wherein the base body comprises an upper frame and a lower frame, the first hook part is connected to the upper frame, the outer wall of the first hook part is extended with an engaging hole, the head of the lower frame is provided with a convex column inserted and matched with the engaging hole, and the tail of the lower frame is detachably connected with the upper frame.

13. The grooved bracket according to claim 12, wherein the engaging hole communicates with the embedded groove, and the end of the convex column is arranged in the embedded groove.

14. The grooved bracket according to claim 13, wherein the side walls near both ends of the embedded body are provided with a plurality of convex edges arranged along a length direction, and the convex columns fall into intervals between the convex edges.

15. The grooved bracket according to claim 12, wherein an end of the upper frame away from the first hook part is fixed with a tailstock, an end of the lower frame away from the first hook part is against the tailstock, the tailstock is fixedly connected with the lower frame through bolts, and the side end of the lower frame is against the side end of the upper frame.

16. The grooved bracket according to claim 12, wherein the side of the lower frame facing the upper frame is provided with a second hook part, and the second hook part is also provided with a trench groove, an embedded groove and an embedded body.

17. The grooved bracket according to claim 1, wherein an auxiliary hole is arranged at a position corresponding to the groove bottom of the trench groove on the outer wall of the hook part, and the auxiliary hole communicates with the embedded groove.

18. The grooved bracket according to claim 1, wherein the inner wall of the trench groove is concavely formed with a side groove extending through one of the side walls of the hook part, and the side groove communicates with the embedded groove.

19. The grooved bracket according to claim 1, wherein an outer wall of the hook part is extended with a side top hole along a direction perpendicular to an axis of the trench groove, the side top hole communicates with the embedded groove and extends through the groove bottom of the trench groove, and the side top hole is extended with the top rod.

* * * * *